United States Patent [19]

Petrovic et al.

[11] 4,431,485
[45] Feb. 14, 1984

[54] TRAVELLING BED DRIER APPARATUS FOR THE OPERATION OF A CARBONIZATION PLANT

[75] Inventors: Vladan Petrovic; Karl Schmid; Henner Schmidt-Traub, all of Essen, Fed. Rep. of Germany

[73] Assignee: Krupp-Koppers GmbH, Essen, Fed. Rep. of Germany

[21] Appl. No.: 376,827

[22] Filed: May 10, 1982

[30] Foreign Application Priority Data

Jun. 11, 1981 [DE] Fed. Rep. of Germany ....... 3123141

[51] Int. Cl.³ .................... C10B 39/02; C10B 57/10
[52] U.S. Cl. .................................. 202/270; 34/174; 34/177; 201/41
[58] Field of Search .................. 202/228, 270; 201/39, 201/41; 34/86, 169, 174, 177; 201/34

[56] References Cited

U.S. PATENT DOCUMENTS

| | | |
|---|---|---|
| 2,351,873 | 6/1944 | Payne ................................... 34/177 |
| 3,090,131 | 5/1963 | Waterman ............................. 34/177 |
| 3,728,230 | 4/1973 | Kemmetmueller ................... 201/39 |
| 3,800,427 | 4/1974 | Kemmetmueller ................. 202/227 |
| 3,843,458 | 10/1974 | Kemmetmueller ..................... 34/86 |
| 4,007,093 | 2/1977 | Doilov et al. ......................... 201/34 |
| 4,165,216 | 8/1979 | White et al. .......................... 201/34 |
| 4,292,743 | 10/1981 | Razus .................................... 34/177 |

Primary Examiner—Bradley Garris
Attorney, Agent, or Firm—Michael J. Striker

[57] ABSTRACT

A travelling bed drier is disclosed, for operation of a carbonization or coking plant in which pre-heating of coal is performed. Adapted so that a fluidized bed drier can be superposed thereon, the travelling bed drier possesses a heat exchange tube within a frame, the tube displaying a surface increased through suitable design such as fins or ribs, a conical tapering in the direction of the coal feed, and discharge connections located at different levels on a side of the frame lying opposite vapor or hot gas entry, the connections being for the discharge of exhaust gas-containing vapors.

2 Claims, 3 Drawing Figures

TRAVELLING BED DRIER APPARATUS FOR THE OPERATION OF A CARBONIZATION PLANT

BACKGROUND OF THE INVENTION

The invention concerns a method for the operation of a carbonization or coking plant, with which the coke furnaces are charged periodically with pre-heated coal, and the generated coke is subjected to a dry cooling by means of a gaseous cooling medium, and the heat discharged from the dry cooling of the coke is used directly or indirectly for pre-heating of the coal.

The invention further concerns a special travelling bed drier, which can be employed advantageously for pre-heating the coal with use of the method.

With processes of this type it is already known to connect the plants for the dry cooling of the coke and for the pre-heating of the coal with each other through a common gas circulation. Such a process is described in German Offenlegungsschrift No. DE-OS 23 04 541, corresponding to U.S. Pat. No. 3,728,230, FIG. 8. Therewith it is provided that the hot gas leaving the coke dry cooler is so led collectively, after appropriate cooling and dust removal, from below into the coal pre-heater, that the wet coal introduced from above is presented in the form of a fluidized bed. In connection therewith, the gas leaving from the top of the coal pre-heater is led again into the lower part of the coke dry cooler. With the manner of operation as outlined, with which the coal to be preheated is led into direct contact with the gas from the coke dry cooler, indeed, however, considerable difficulties can occur in practice, because the circulating gas stream is led back into the coke dry cooler with the entire steam content which it has absorbed from the coal pre-heater. As a result of the high steam content of the gas led in circulation, water gas forms to a considerable extent on the hot coke. Through this water gas reaction, however, on the one hand a not inconsiderable consumption of the red-hot coke is caused and, on the other hand, the explosive water gas produced naturally also brings forth considerable problems with regard to operational safety.

A method of the mentioned type is known from German Auslegeschrift No. DE-AS 2342184, corresponding to U.S. Pat. No. 3,800,427, with which the circulation gas of the coke dry cooling is utilized initially in a heat exchanger (waste-heat boiler) for the generation of steam, which is used not only as heating medium but also as flowing bed medium for the pre-heating of the coal. The pre-heating of the coal follows therewith in a single stage in an indirectly heated fluidized bed drier, so that a very intensive heat supply is necessary, which itself, based upon experience, disadvantageously affects the condition of the coal. It is thus possible for there to occur an agglomeration or adhering of the coal to the heating tubes of the fluidized bed drier. Likewise can result a local overheating of the coal particles, whereby changes in the technical coking characteristics can take place.

SUMMARY OF THE INVENTION

The invention is therefore based upon the object of further improving the methods of the above mentioned type, whereby on the one hand the heat liberated with the dry cooling of the coke is utilized as optimally as possible and, on the other hand, the process of the coal pre-heating should be further improved and simplified by means of apparatus.

The method serving for the solution of this object is characterized according to the present invention by accomplishing the coal pre-heating using a travelling bed drier, having a heat exchange tube which is heated with hot gas or waste-heat vapor from the coke dry cooling, whereby the exhaust gas-containing vapors produced in the travelling bed drier are withdrawn therefrom at different levels, cleaned, cooled, condensed and subsequently led into the waste water.

The insertion of the travelling drier for the mentioned purpose necessitates therewith, in comparison to use of a fluidized bed drier, a smaller energy expenditure, since in this case no energy is needed for the fluidization of the coal. Moreover, in travelling bed driers, the drying of the coal is generally performed under more sparing conditions than in the fluidized bed driers. In the latter, the fluidization of the coal leads namely to a stronger grain disintegration and to a greater distilling off, whereby however under certain circumstances the technical coking characteristics of the coal can be influenced unfavorably. Through the omission of the fluidization arrangements, moreover, the apparatus expense with travelling bed driers is less than with fluidized bed driers.

When the inserted coal has higher water contents, the flowability of the moist coal in the travelling bed drier can indeed be impaired. The method according to the present invention is accordingly performed in such manner, in a preferred embodiment, that a fluidized bed drier is superposed onto the travelling bed drier, whereby the coal is initially dried in the fluidized bed drier, through heating to a temperature between about 60° and 100° C., only to the extent that a sufficient flowability thereof is guaranteed in the travelling bed drier, in which the coal is then heated up to a final temperature of about 200° C. and dried to a residual water content of about 0.1% by weight.

As has already been stated, the heating of the heat exchange tube of the travelling bed drier follows either through hot gas (nitrogen) or waste-heat vapor from the coke dry cooling. The hot gas displays therewith normally a temperature of about 600° C., and the waste-heat vapor is, as a rule, led with a pressure between about 20 and 40 bar into the heat exchange tube of the travelling bed drier. The same applies naturally also for the heat exchange tube of the fluidized bed drier, so far as a combination of fluidized bed and travelling bed drier is used.

In order that the pre-heating of the coal should not be impaired by a failure or a disturbance of the coke dry cooler, it can additionally be provided with a combustion chamber in which a flue gas is produced through combustion of a solid, liquid or gaseous fuel, which if necessary can be brought into play for heating of the travelling bed and/or fluidized bed drier. Since the hot flue gas produced with the combustion displays at about 1400° C. a temperature too high for this purpose, the gas temperature can be adjusted to the desired value through admixture of steam. Obviously, this steam can be branched off completely or partially from the stream of vapors arising with the pre-heating of the coal.

The novel features which are considered characteristic for the invention are set forth in particular in the appended claims. The invention itself, however, both as to its construction and its method of operation, together with additional objects and advantages thereof, will be

In the flow schemes obviously only the apparatus parts which are unconditionally necessary for explanation of the process are represented, while other additional arrangements as well as the apparatus parts of the actual carbonization are not represented.

DESCRIPTION OF THE PREFERRED EMBODIMENTS

Figure 1:
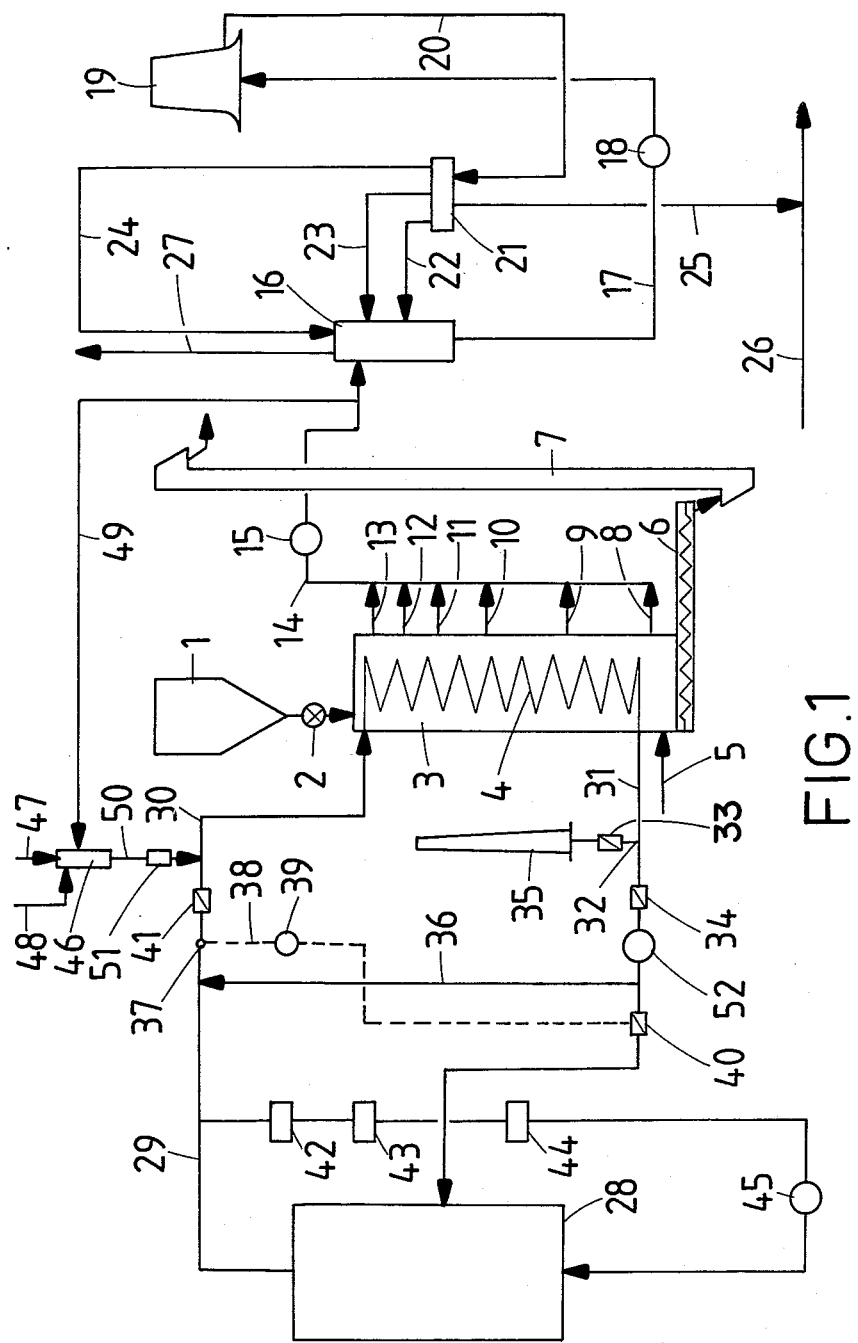
FIG. 1 is a flow scheme of the method according to the present invention, with which only a travelling bed drier is used, which in this case is heated with hot gas from the coke dry cooling.

In FIG. 1, the coal to be coked is delivered from the feed hopper 1 across the bucket wheel charging valve 2, from above, into the travelling bed drier 3. In the drier is located the heat exchange tube 4 which gets heated with hot gas from the dry cooling of the coke, which tube can be provided on its outside with fins or ribs. The delivered coal travels from above, downwards through the travelling bed drier 3, and is thereby correspondingly heated. The resistance during flowing of the coal is overcome by the particular weight, whereby the variable dwell time of the coal in the travelling bed drier 3 is determined by discharge of the coal in the lower part thereof. The dried and pre-heated coal is led from travelling bed drier 3 across one or more screw conveyors 6 disposed in close proximity with each other and a chain conveyor 7, to the not represented coal tower of the coking-furnace block. Through conduit 5 inert gas can be blown into the drier-conveyor system.

The exhaust gas-containing vapors separated from the moist coal are withdrawn at different levels across conduits 8–13 from travelling bed drier 3, and led across collecting conduit 14 and blower 15 into the circulation washer 16, in which, in addition to a condensation, there follows the washing out of contaminants. Instead of the washer construction represented in the flow scheme, naturally also some other washer construction can be used here, e.g. a venturi washer. The liquid leaving circulation washer 16 is delivered across conduit 17 and pump 18 to the cooling tower 19, in which further cooling down follows, to a temperature of about 20° C. The cooled liquid is then led across conduit 20 into the cool water distributor 21. From here, the necessary cool water is delivered across conduit 22–24 again to the different levels of the circulation washer 16. The excess liquid is withdrawn across conduit 25 from the cooling water distributor 21, and led into the waste water canal 26. If necessary, a waste water treatment arrangement can also be provided in conduit 17 leading to cooling tower 19. The gas escaping from circulation washer 16 is withdrawn across conduit 27 and led to the chimney 35.

The hot gas stream leaving from the top part of the coke dry cooler 28 with a temperature of about 800° C. is withdrawn across conduit 29, from which branches off the gas entry conduit 30, through which the partial stream of hot gas is withdrawn, which is utilized for indirect heat transfer in travelling bed drier 3. This partial stream is led, with a temperature of about 600° C., into the heat exchange tube 4 of the travelling bed drier 3. After passing through the tube, the gas is led back across the gas exit conduit 31 and the blower 52 to coke dry cooler 28, and is again led into there, after appropriate compression, into the middle area, with a temperature of about 250° C. From gas exit conduit 31 branches the conduit 32, through which, with appropriate setting of the regulating valve 33 and 34, a partial stream of the gas can be blown across the chimney 35 into the atmosphere. Moreover, behind the blower 52 is provided a bypass conduit 36, through which the gas exit conduit 31 is connected with the gas entry conduit 30. Through this bypass conduit 36 the hot gas in the gas entry conduit 30 can be admixed with cold gas from the gas exit conduit 31, for purposes of temperature regulation. For this, the temperature measuring point 37 is provided in the gas entry conduit 30, whereby the value determined there is transmitted across the impulse conduit 38—drawn as a broken line—to the operating mechanism 39, which for its part in turn operates the motor-driven regulating valve 40 in gas exit conduit 31, in dependence upon a pre-given set value. With a drop in the gas temperature determined at temperature-measuring point 37, to below the pre-given set value, the regulating valve 40 is correspondingly further opened, so that the gas supply to coke dry cooler 28 is increased. This effects naturally also an increase in the stream of hot gas into conduit 29 and into gas entry conduit 30, while simultaneously the amount of gas which can be led across bypass conduit 36 into the gas entry conduit 30 is correspondingly decreased. Hereby, a collective rise in the gas temperature in gas entry conduit 30 is obtained. On the other hand, in the reverse case, if the gas temperature determined at temperature-measuring point 37 exceeds the pre-given set value, then the motor-driven regulating valve 40 is correspondingly partially throttled, which naturally leads to a decrease in the gas supply to the coke dry cooler 28, and simultaneously to an increase in the supply of cold gas across bypass conduit 36. This leads then to the desired drop in the gas temperature in the gas entry conduit 30. For further regulation of the gas stream in this conduit, there is provided, moreover, the regulating valve 41.

The partial stream of hot gas leaving coke dry cooler 28 which is not used for pre-heating of the coal is led, in conduit 29, successively through the arrangements 42, 43 and 44, in which the gas, corresponding to requirements, has its dust removed and is cooled. That is, these arrangements can involve a dust separator and either a waste-heat boiler or gas cooler. The gas, dust removed and cooled to about 150° C., is subsequently compressed in the blower 45, back to the operational pressure of the coke dry cooler 28, and led therein from below.

Thus, with the method according to the present invention, the re-introduction of the gas led in circulation is provided at two different places on coke dry cooler 28, whereby only the partial stream which is not brought up for the preheating of the coal is in known manner led into the bottom part of the coke dry cooler 28. The partial stream of gas coming from travelling bed drier 3 is, in contrast, led into the middle part of coke dry cooler 28, where the coke to be cooled still displays a temperature of about 400°–600° C. Through this manner of operation, on the one hand the pressure loss of the gas in coke dry cooler 28 is minimized. On the other hand, there is provided thereby a favorable influence on the temperature difference between the gas and the coke to be cooled, and, moreover, there is connected therewith an improved controllability not only with regard to the gas supply but also with regard to the heat removal from the coke to be cooled.

In order that the pre-heating of the coal in travelling bed drier 3 should not be impaired by a failure or a disturbance at the coke dry cooler 28, there is additionally provided a combustion chamber 46, to which is led, across conduit 47, a gaseous, liquid or solid fuel, as well as, across conduit 48, the necessary oxygen or air. Since the hot flue gas produced with the combustion displays at about 1400° C. too high a temperature, steam is led across conduit 49, which branches off from conduit 14. Through the addition of steam, the flue gas temperature can be depressed to the desired value of, for example, 600° C., and it is with this temperature that the gas is then fed across conduit 50 into the gas entry conduit 30. Regulating valve 51 is provided in conduit 50 so that the amount of gas delivered can, if necessary, also be appropriately throttled, and the combustion chamber 46 can be used in case of need also as auxiliary heater.

Figure 2:
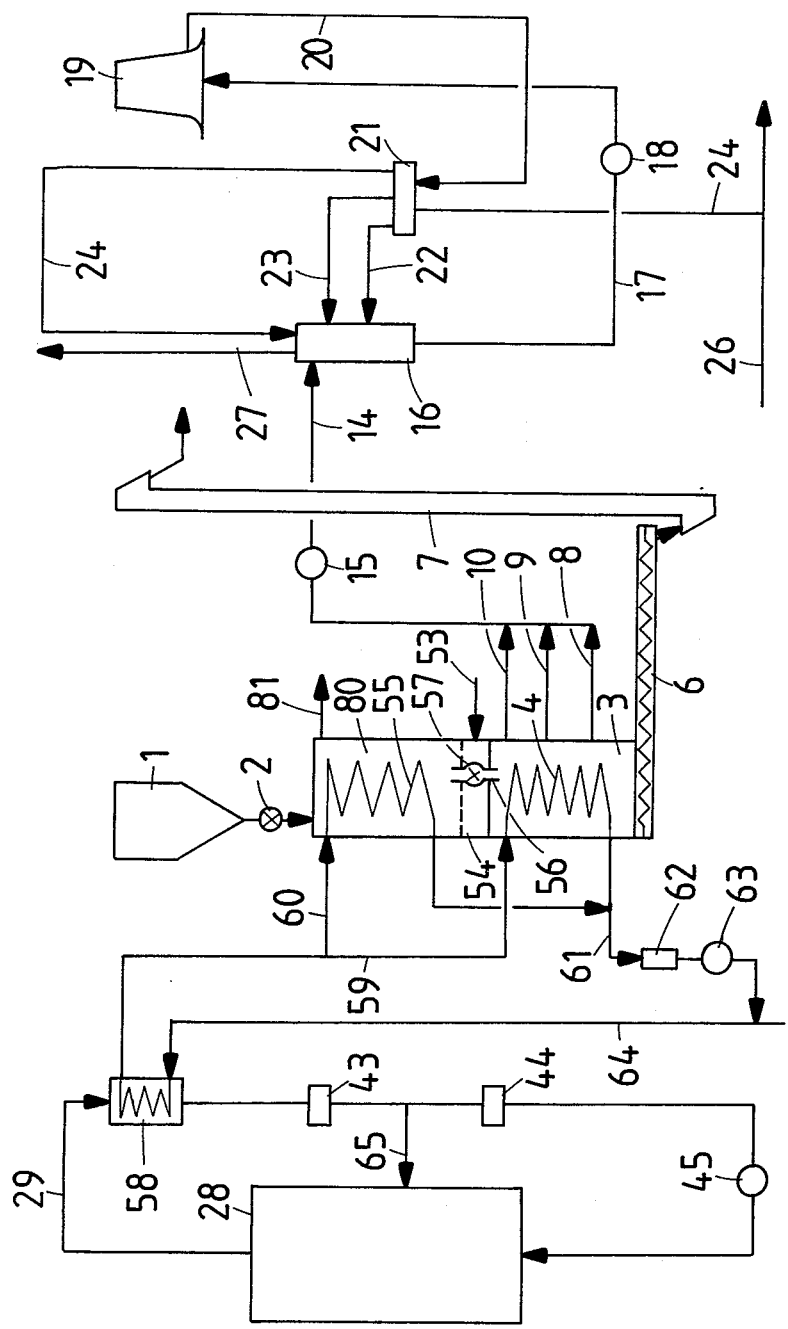
FIG. 2 is a flow scheme of the method according to the present invention, with which a combination of fluidized bed and travelling bed driers is used, heated with waste-heat vapor from the coke dry cooling.

The flow scheme represented in FIG. 2 concerns a variation of the method, with which the travelling bed drier 3 is connected in series with a fluidized bed drier 80 and, moreover, for the heating of both driers, instead of hot gas, waste-heat vapor from the coke dry cooling is used. Naturally, corresponding reference numerals in both flow schemes (FIG. 1 and FIG. 2) have the same meaning. With the flow scheme represented in FIG. 2, the fluidized bed drier 80 and the travelling bed drier 3 are disposed directly superimposed and integrated into a structural unit. The coal, which displays a water content of about 9% by weight, is led from feed hopper 1 across the bucket wheel charging valve 2, initially into the top part of the fluidized bed drier 80, in which it is suspended in a coal-steam fluidized bed. The steam necessary for this is led across conduit 53 and the gas and vapor permeable flow bottom 54 into the fluidized bed drier 80. Heat exchanger tube 55 provides for the necessary heating of the coal in fluidized bed drier 80. Herewith the coal in fluidized bed drier 80 is initially heated up to a temperature of about 65° C. and dried to a water content of about 5% by weight. This degree of drying suffices in this case in order to guarantee the flowability of the coal into and in travelling bed drier 3. Thereupon the coal is subsequently led across tube conveyor 56, provided with a bucket wheel charging valve 57, into the travelling bed drier 3 lying directly thereunder, in which follows the further heating up to a final temperature of about 200° C. and the drying to a residual water content of about 0.1% by weight. The discharge of vapors and coal from travelling bed drier 3 as well as the vapor treatment corresponds to the manner of operation according to FIG. 1 and therefore no longer required to be more closely explained here. In the top part of the fluidized bed drier 80 is provided the conduit 81, through which the vapors produced are withdrawn from the drier. These vapors can, after partial condensation and re-heating, be led back to conduit 53 and used anew for fluidization of the coal in the fluidized bed drier 80. For the partial condensation of the vapors, the already present arrangements for this purpose can be used together in connection with travelling bed drier 3.

The stream of hot gas leaving the top part of coke dry cooler 28 across conduit 29 is in this case led in its entirety into waste-heat boiler 58. The waste-heat vapors generated there are conducted across conduits 59 and 60 into the heat exchange tubes 4 and 55 of the drier system. After passing therethrough, the cooled, condensate-containing saturated vapor is led across conduit 61, condensate separator 62 and pump 63 into the feed water conduit 64, which leads back to the waste-heat boiler 58. For the management of the circulation of the cooling gas pump the coke dry cooling it is also again provided that a partial stream of the gas is withdrawn from conduit 29 and led across conduit 65 into the middle part of coke dry cooler 28.

Figure 3:
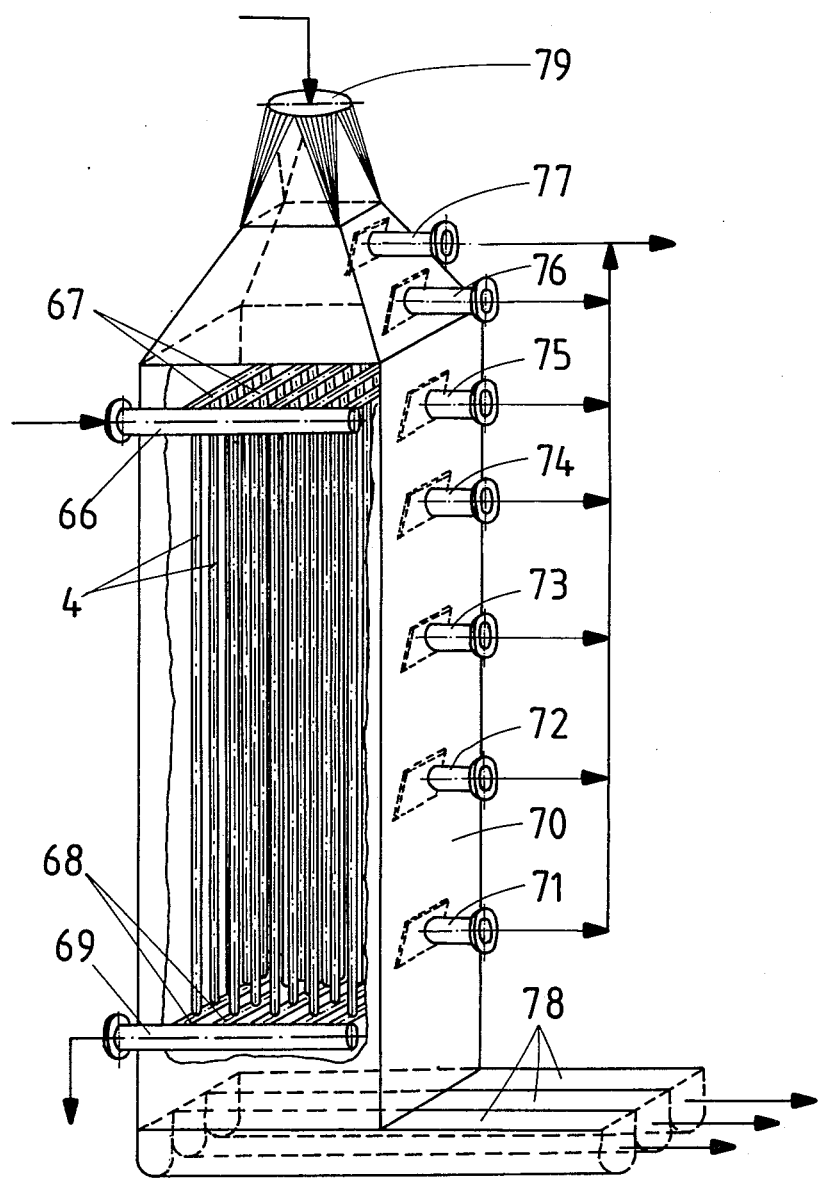
FIG. 3 shows a travelling bed drier, which can be used for performance of the method according to the present invention.

In FIG. 3 a travelling bed drier is represented, which can be used for the performance of the method according to the present invention. Since the drier, represented as an embodiment, is supposed to be heated with vapor, the heat exchange tube 4 in this case is disposed vertically, in order to guarantee a uniform condensation of the saturated vapor. The heat exchange tube 4 should herewith be formed as so-called fin tubes, in order to further improve the heat exchange effect. When, instead of vapor, hot gas is provided for heating of the heat exchange tube 4, then it (they) can naturally also be disposed horizontally or inclined. The supply of vapor follows across conduit 66, from which branch off the connecting conduits 67 to the individual heat exchange tubes 4. A corresponding tube system 68, 69 is also provided in the bottom part of the drier for the draining of the condensate-containing saturated vapor. The frame 70, which houses the tube system, is manufactured from steel, preferably, and can be provided on the outside with a wear-resistant coating. Outside, in case of need, an insulation can be applied, which protects the drier sufficiently against loss of heat. On the side lying opposite the vapor entry, the frame 70 is provided at different levels with the drain connections 71–77 for the discharge of the exhaust gas-containing vapors, as indicated by the arrows. In the top part, the frame 70 displays a conical tapering in the direction of coal feed 79. This helps to distribute the coal delivered from above, uniformly upon entry into the travelling bed drier. Underneath the frame 70 are disposed tanks 78, into which the screw conveyors 6 (FIGS. 1 and 2) are placed, which evacuate the coal from the travelling bed drier.

It will be understood that each of the elements described above, or two or more together, may also find a useful application in other types of coal treatments differing from the types described above.

While the invention has been illustrated and described as embodied in a method and apparatus for the operation of a carbonization plant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Travelling bed drier for pre-heating of coal in a carbonization plant employing pre-heated coal, said drier being arranged and constructed to permit the coal to flow therethrough via gravity and, comprising a heat exchange tube and frame means; said heat exchange tube displaying on its coal side surface-increasing means, said tube being accommodated in said frame means, said frame means having a side displaying vapor or hot gas entry connected to said tube, a conical tapering in the direction of its coal feed, as well as a plurality of drain connections at different levels on a side lying opposite said side displaying vapor or hot gas entry, said connections being for the discharge of exhaust gas-containing vapors released from the coal during pre-heating.

2. Travelling bed drier according to claim 1, wherein said surface-increasing means comprises fins or ribs.

* * * * *